Oct. 20, 1936.       G. NEMETHY       2,058,249
GRASS CUTTER AND TRIMMER
Filed May 8, 1936
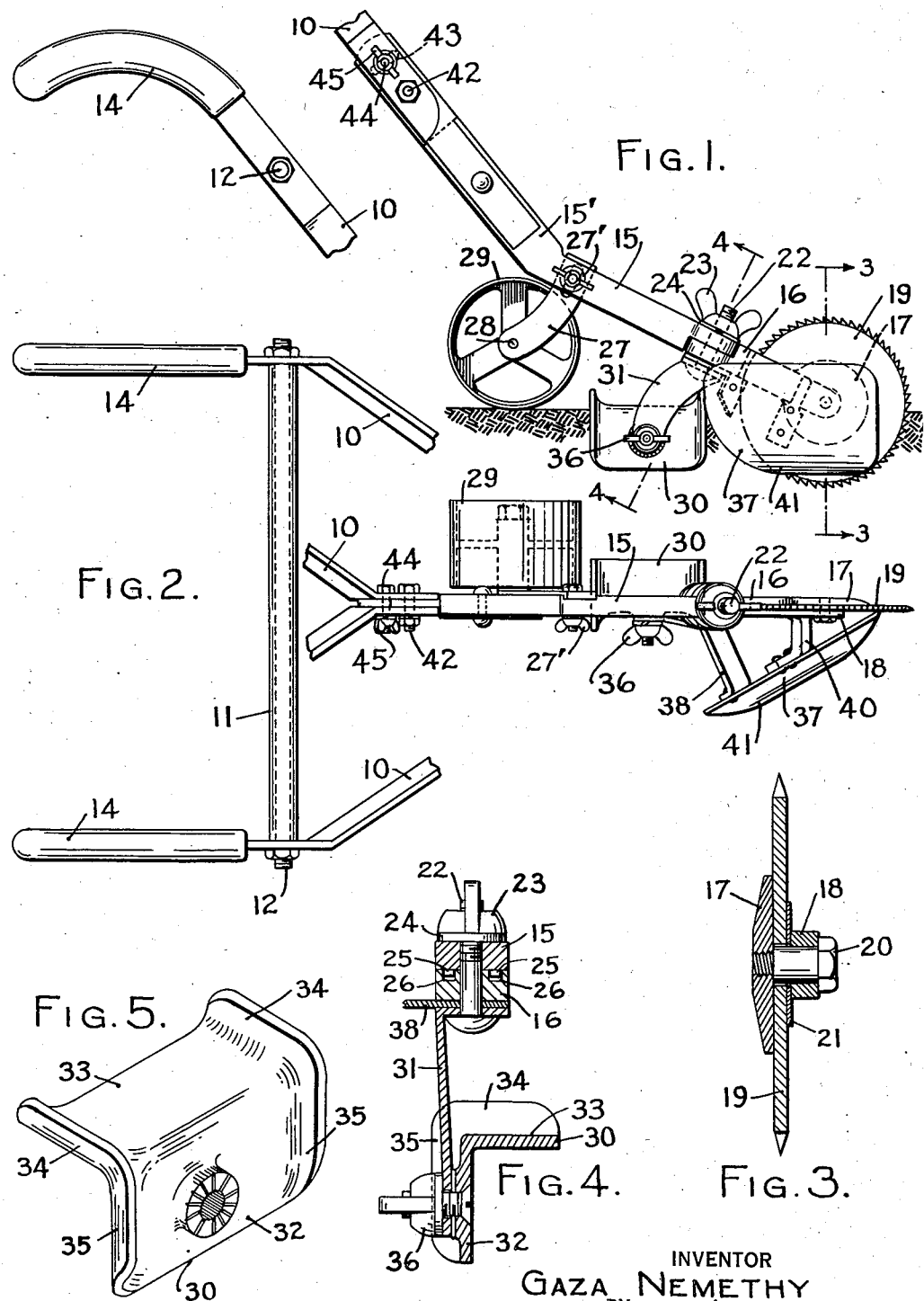
INVENTOR
GAZA NEMETHY
BY
Edward S. Higgins
ATTORNEY Patented Oct. 20, 1936

2,058,249

UNITED STATES PATENT OFFICE 2,058,249

GRASS CUTTER AND TRIMMER

Gaza Nemethy, Yonkers, N. Y.

Application May 8, 1936, Serial No. 78,551

4 Claims. (Cl. 97—227)

This invention relates generally to grass cutters or trimmers and more particularly to devices for cutting or trimming the edges of grass lawns adjacent the walks in order to provide a neat and even edge.

An object of the present invention is to provide a cutter and trimmer that is positive and effective in operation.

Another object is to provide such a device that is balanced and easy to operate.

Another object is to provide such a device that is readily adjustable to permit adjustment of the size of the depth of the cut.

Another object is to provide such a device with a plow or sweeper for pushing the cut grass away, this plow being positioned alongside of and adjacent the cutting edge of the blade.

Still another object is to provide such a device with a shoe for guiding the device in its movements.

A still further object is to provide such a device that is simple and rugged in construction and economical to manufacture.

In the drawing—

Figure 1 is a side view of the improved cutter with the handles broken away.

Figure 2 is a top plan view of the same.

Figure 3 is a section on the line 3—3 of Fig. 1.

Figure 4 is a section on the line 4—4 of Fig. 1.

Figure 5 is a perspective view of the guide shoe.

The improved cutter comprises a handle frame consisting of a pair of spaced arms 10 formed of heavy flat metal stock. The arms 10 are held in spaced relationship by a pipe 11 through which passes a bar 12 screw threaded at its ends to receive nuts. Handles 14 of wood or other suitable material are provided at the ends of the arms 10.

The cutter frame proper consists of a horizontal body member 15 formed of flat heavy metal stock. This member terminates at one end in an upwardly slanting portion 15'. Swingably connected to the other end of the member 15 is a slotted arm 16 formed of the same material. This member forms an extension of the member 15 and swings on a horizontal plane. The arm 16 terminates at one side of the slot in a disk portion 17 having a central opening, and terminates at the other side of the slot in a perforated ear 18. Positioned in the slot of the arm 16 is a disk cutter 19. This cutter is mounted on a bolt 20 which passes through the ear 18, the cutter 19 and the disk portion 17. The cutter 19 and the disk portion 17 and on the other side against a washer 21, on the bolt 20. The outer end of the bolt 20 is screw threaded to engage the internal screw threads on the disk 17. The cutter 19 has a frictional fit on the bolt 20 and the disk 17 engages a shoulder on the bolt. This cutter is provided with peripheral teeth which are shaped and pointed in a direction against the direction of travel of the device, or anti-clockwise as seen in Fig. 1 to prevent the disk cutter from moving out of the ground.

The swingable arm 16 is fastened to the member 15 by means of a bolt 22 passing through overlapping portions of the arm and member 15, and is adapted to be held in adjusted position by a wing nut 23 on the bolt. A washer 24 may be provided between the wing nut 23 and the upper surface of the member 15 to aid in holding the parts against movement. The washer 24 may be serrated on one or both surfaces or may be split if desired to help hold the parts. The surface of the overlapping portion of member 15 may be provided with small studs 25 which are adapted to fit in grooves or depressions 26 in the adjacent surface of the overlapped portion of the arm 16.

Secured to the frame member 15 at one end and on one side thereof is a depending bracket 27 and carried on the lower end of this bracket is a horizontal axle 28 upon which is rotatably mounted a broad faced wheel or roller 29. This wheel 29 is disposed on one side of the frame member 15 as will be seen from Fig. 2. This bracket may be adjusted vertically by means of a bolt and slot connection having a wing nut 27' on the bolt for holding the bracket in adjusted position. The height of the frame above the roller 29 controls the depth of the cut and this height can be adjusted as just described.

A guide shoe 30 is mounted on a bracket 31 which is fastened to the bolt 22 on the underside of the arm 16. The bracket 31 and shoe 30 move horizontally in unison with the slotted arm 16. The shoe is formed with a vertical portion 32 and a horizontal portion 33. The front and rear edges of the horizontal portion 33 are curved or flared upwardly as at 34, and the front and rear edges of the vertical portion 32 are curved outwardly as at 35. The cutter 19 and the shoe 30 are so positioned relatively that the vertical portion 32 of the shoe is in a line with the plane of the body of the disk cutter. The shoe 30 is also adjustable on its bracket 31 so that it may be tilted upwardly or downwardly on a vertical plane. A wing nut 36 holds the shoe in adjusted position.

The plow or sweeper 37 consists of an elongated plate member mounted at one end on a bracket 38 which is carried by a bolt 22, and at its other end on a bracket 40 formed on one side of the arm 16. The front end of the plow plate is in engagement with one face of the cutter disk adjacent the periphery thereof, while the rear end of the plow is spaced away from the arm 16 as will be seen from Fig. 2. The plow 37 is also curved or rolled upwardly slightly at its bottom end 41. The front end of the plow engages the cutter over a considerable space, and this engagement together with the engagement by the disk 17 on the other side of the cutter prevents any flexing or bending of the cutter.

While the cutter disk is frictionally held against rotation in ordinary use by the disk 17 and plow 37, it may be rotated by the operator if desired by merely forcing it around and thus present a new set of teeth for cutting purposes.

The handle arms 10 are adjustably positioned to the upwardly slanting portion 15' of the body member by means of a bolt 42 loosely passing through aligned openings adjacent their ends and an opening in the slanting portion 15'. This slanting portion 15' is also provided with an elongated slot 43 adjacent its end opening. A bolt 44 passes through the ends of the handle arms 10 and through the slot 43 and is provided with a wing nut 45 to hold the handle arms in adjusted position. The handles swing upwardly to adjust the device to the size of the operator.

Placing the cutting disk at the front of the device permits the operator to see it without any obstruction and to guide it along the edge to be cut.

Mounting the cutting disk, plow and guide shoe so that they are adapted to be moved as a unit, permits adjustment of the device for readily cutting around curved edges.

Furthermore, arranging the cutting disk and plow in the front, the guide shoe in the middle and the broad faced wheel at the rear results in a balanced device easy to handle and places the weight and power at the rear thus making it more effective.

Changes in details might be restored to without departing from the principle of the invention and I desire to be limited only by the state of the prior art and the appended claims.

I claim:

1. In a grass cutter, a frame, a support roller mounted on the frame for vertical adjustment, a guide shoe adjustably mounted forward of the roller, a cutting disk mounted on the frame forward of the shoe and a plow mounted on the frame alongside the cutting disk, said shoe, cutting disk and plow being swingable on a horizontal plane as a unit.

2. In a grass cutter, a frame, a supporting roller mounted on the frame for vertical adjustment, a guide shoe adjustably mounted forward of the roller, a cutting disk mounted on the frame forward of the shoe, a plow mounted on the frame alongside of and having its front edge engaging said disk, and operating handle arms.

3. In a grass cutter, a frame member, a supporting roller on the frame member, a slotted arm swingably connected to the frame member and forming a forward extension thereof, the portion of the terminal of the arm on one side of the slot being in the form of a disk and the other portion terminating in a perforated ear, a bolt passing through said disk, slot and ear, a cutting disk mounted on said bolt in said slot, a guide shoe on the frame member behind said cutting disk, and a plow mounted on the frame and along the cutting disk on the side opposite the terminal disk, the front edge of said plow engaging the cutting disk adjacent its periphery, said front edge and terminal disk being adapted to prevent said cutting disk from flexing.

4. In a grass cutter, a frame member, a supporting roller adjustably mounted on the frame member, a slotted arm swingably connected to the frame member and forming a forward extension thereof, the portion of the terminal of the arm on one side of the slot being in the form of a disk and the portion on the other side being in the form of a perforated ear, a bolt passing through said disk, slot and ear, a cutting disk mounted on said bolt in said slot, said cutting disk having teeth shaped to point in a direction opposite to the direction of travel of the cutter, a guide shoe on the frame member behind said cutting disk, and a plow mounted on the frame and along the cutting disk on the side opposite the terminal disk, the front edge of said plow engaging the cutting disk adjacent its periphery, said front edge and terminal disk being adapted to prevent said cutting disk from flexing, said cutting disk, plow and guide shoe being swingable in unison on a horizontal plane.

GAZA NEMETHY.